Jan. 19, 1937.　　F. W. MATTINSON　　2,068,031
RAYON AND PROCESS AND APPARATUS FOR THE MANUFACTURE THEREOF
Filed Nov. 15, 1934　　5 Sheets-Sheet 5
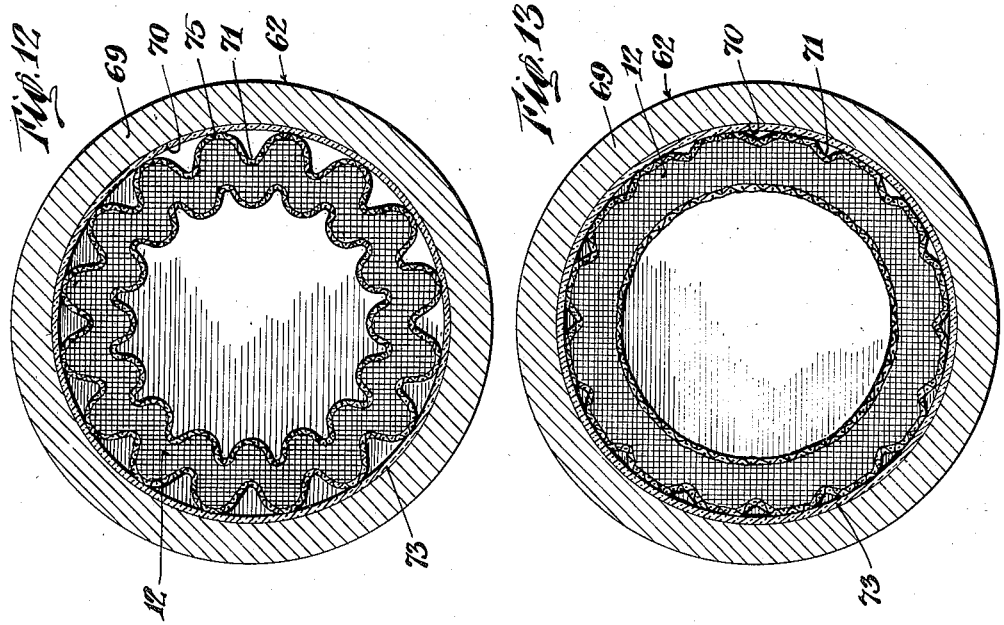
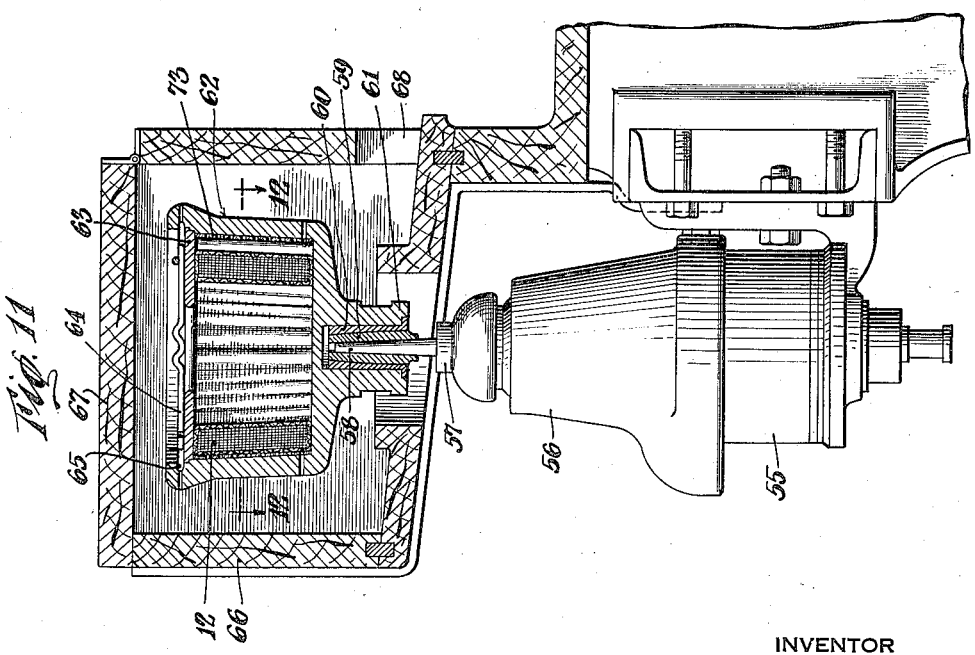
INVENTOR
Frank Wilfred Mattinson
BY
Cooper, Kerr + Dunham
his ATTORNEYS Patented Jan. 19, 1937

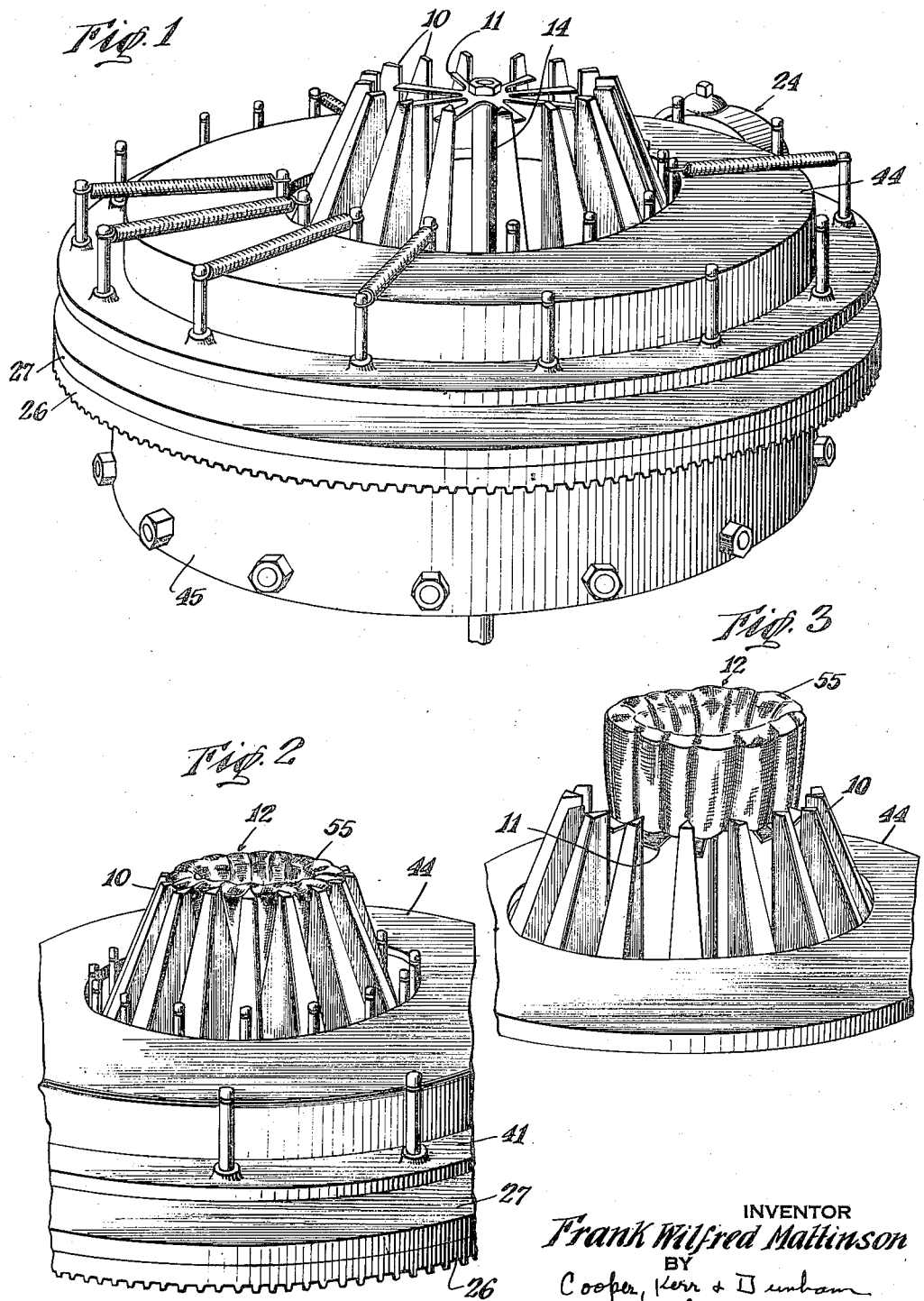

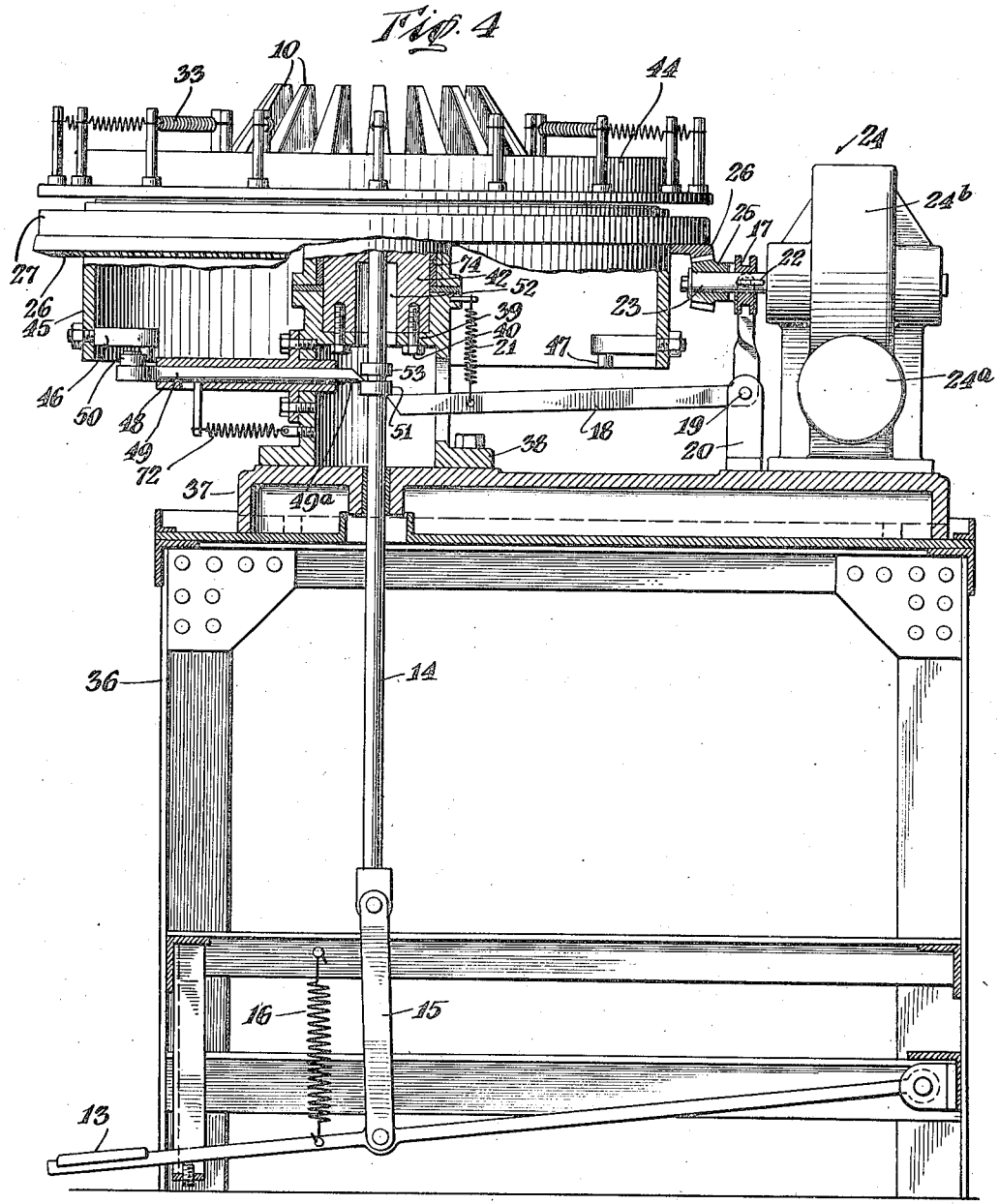

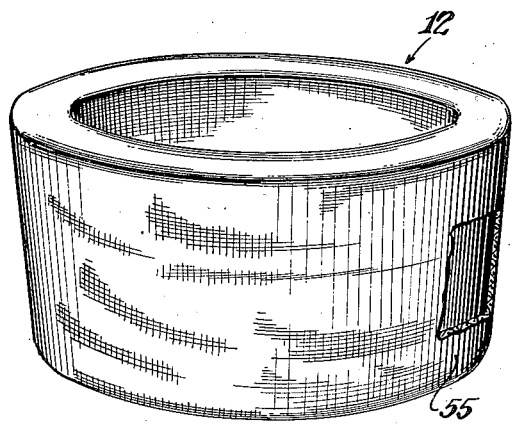
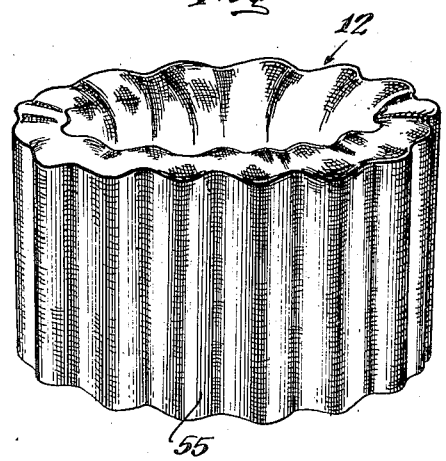
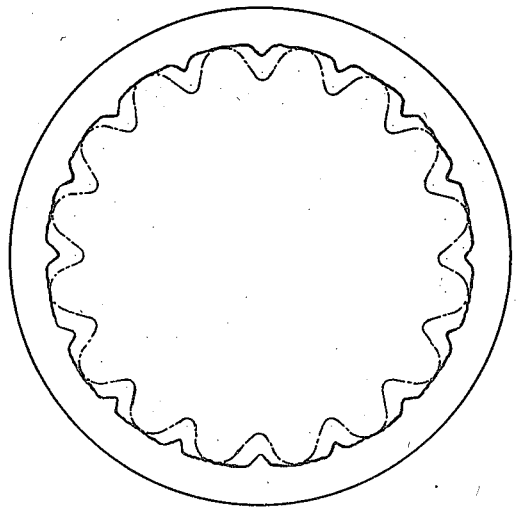
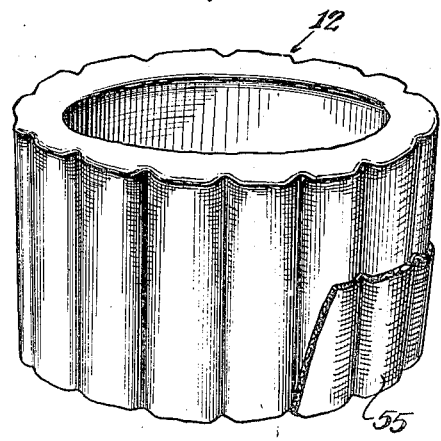

2,068,031

UNITED STATES PATENT OFFICE 2,068,031

RAYON AND PROCESS AND APPARATUS FOR
THE MANUFACTURE THEREOF

Frank Wilfred Mattinson, Utica, N. Y., assignor
to Skenandoa Rayon Corporation, Utica, N. Y.,
a corporation of Delaware Application November 15, 1934, Serial No. 753,134

30 Claims. (Cl. 18—8)

This invention relates to the manufacture of rayon or artificial silk, and more particularly to a new and improved form of rayon, and a process and apparatus for the manufacture thereof.

The improved process comprises a novel method of treating the rayon in cake form, after it has been washed or otherwise purified, to improve the dyeing and other qualities of the rayon yarn and of fabric made therefrom. The improved apparatus includes both a machine for the treatment of a rayon yarn "cake" after it has been washed and otherwise liquid or fluid treated but before it is dried, and a machine for the centrifugal treatment and drying thereof. An important feature of the invention is the resulting product, which constitutes a new and improved rayon yarn "cake", and a new and improved rayon yarn contained therein and resulting therefrom.

An object of the invention is to provide a new and improved form of rayon, and a new and improved rayon yarn cake composed thereof.

Another object of the invention is to provide a new and improved rayon yarn, and a new and improved process and apparatus for the manufacture thereof, having high uniformity of dyeing quality, elasticity, denier, and strength, said yarn being particularly adapted for use in the production of rayon fabric having improved uniformity of dyeing quality.

Another object of the invention is to provide a novel process for the manufacture of rayon yarn having improved uniformity of dyeing quality, elasticity and other physical properties.

Another object of the invention is to provide apparatus for use in the treatment of rayon yarn cakes after they have been liquid or fluid "processed", such apparatus including both a "crimping machine" for corrugating and reducing the diameter of a rayon cake before it is dried, and apparatus for the centrifugal treatment of the crimped rayon yarn cake of reduced diameter.

A further object of the invention is to provide a new and improved rayon yarn, and a rayon yarn cake composed thereof, in which the yarn throughout the cake has a substantially uniform "dye index", and possesses the important property of dyeing in a substantially uniform manner, both before and, more particularly, after, fabrication of the yarn, and in which the rayon yarn has improved uniformity of elasticity, "crinkle", "wave", and other physical properties in addition to its improved uniformity of dyeing quality. To the ends stated a substantially uniform "superficial" elasticity or "crinkle" or "waviness", is imparted to the yarn in all parts of the improved yarn cake and is thereafter preferably "set" or fixed in the yarn. Thus an important object of the invention is the provision of a new and improved rayon yarn cake in which the yarn is substantially uniformly crimped or crinkled, and has a substantially uniform elasticity, in all parts of the cake.

Other objects of the invention will appear from the following description.

In the manufacture of rayon in this country the process commonly employed is the centrifugal one, sometimes referred to as "pot-spinning" or "bucket-spinning". As a result of this spinning process there is produced in the spinning pot or "bucket", a "cake" of spun and twisted rayon or fibre. In the case of the viscose process, with reference to which I shall more particularly describe my invention, this cake is composed partly of the twisted artificial silk (rayon) fibres themselves, and partly of various salts, acids and other impurities carried over by the fibres from the coagulating "spinning bath" through which the filaments are passed on their way to the spinning bucket, or resulting from decomposition of the viscose. In order to complete the manufacture of the rayon it is necessary to subject the spun fibres to various purifying and drying treatments, sometimes referred to as "processing". In the viscose process, these treatments commonly include "aging" the fibre, then washing to remove salts and other impurities, desulphuring, bleaching, further washing, soaping or oiling, and finally drying the fibre or thread before it is wound into a cone or other package in which it is to be sold, or from which it is to be fabricated. Dyeing is ordinarily performed after fabrication of the finished thread.

The ordinary and generally employed method of treating or "processing" the yarn cakes, after they are "doffed" from the spinning machines (i. e., removed from the centrifugal pots in which they are spun), is first to reel the yarn into skeins, which are then subjected to the various treatments for completion of the yarn. Such a reeling and skeining operation is, however, subject to many objections; for example, it frequently results in breakage and consequent "degradation" of the yarn (the grade of a yarn package being affected by the number of knots therein), as well as weakening of the fibre, and possibly adversely affecting its dyeing qualities.

Attempts have also been made to rewind the yarn from the cakes onto hollow, perforated bobbins, upon which the yarn is subjected to the subsequent operations. This method, also, has certain disadvantageous features, prominent among which is the fact that it, like the reeling and skeining method, includes the step of winding the wet yarn from the cakes into another form of package. When wet and comparatively fresh, the yarn is relatively weak, hence subject to frequent breakage in any such winding operation.

In an effort to overcome the foregoing and other difficulties encountered in the methods generally in use, many attempts have been made to apply the necessary treatment to the yarn in cake form, just as the cakes come from the spinning machines. In fact, so advantageous and desirable is such a method of applying the necessary "processing" or treatment to the yarn while still in cake form, without any rewinding of the yarn or disturbance thereof, that the discovery of such a process has been the subject of much and long-continued effort and research in the rayon industry, and has occupied the attention of numerous inventors for many years. So far as I know, or have been able to ascertain, however, no practical or commercially successful process for the treatment of rayon yarn in cake form existed prior to the invention by Beirne Gordon, Jr., of the method and apparatus described in United States Patent No. 1,973,953, patented September 18, 1934. That process and apparatus have gone into extensive and highly successful commercial use, on a large scale, and have successfully solved the problem of processing rayon in cake form.

The present invention is applicable to, and may be used in connection with, the process and apparatus described in the patent just mentioned.

The usual and conventional form and shape for a rayon yarn (sometimes called "fibre" or "thread") cake, when it is spun, which shape is ordinarily retained after after the cake is "doffed" from the spinning pot (sometimes called the "box" or "bucket"), is that of the hollow frustrum of a cone. So far as I know, such hollow frustro-conical yarn cakes (as illustrated, for example, in the drawings of the said Patent No. 1,973,953), are the type almost universally spun in this country, although in certain foreign countries it has, from time to time, been proposed or attempted to spin a straight-walled or cylindrical (hollow) cake.

In practicing the process of my invention I may proceed according to the following illustration:

I first subject a spun yarn cake to a suitable purification or "processing" treatment, by a succession of treating liquids (for example, as described and claimed in the said Patent No. 1,973,-953, just referred to), and then perform a crimping operation upon the purified cake, in such a manner that small "corrugations" or "crimps" are imparted to the yarn, and the diameter of the cake is simultaneously substantially reduced. The corrugations are preferably imparted to the yarn cake from the outside, in such a way that the outer layer of yarn is the most deeply corrugated, and the depth of the corrugations decreases progressively, in each successive layer of yarn, toward the inside of the cake.

After the yarn cake has been thus crimped and reduced in diameter, it is next inserted in a "centrifuge pot" of suitable diameter to receive and support the crimped cake. In this operation a perforated celluloid or other suitable collar, or funnel, preferably having a slight vertical taper, may be employed, being placed around the crimped, corrugated cake, to maintain its shape and reduced diameter, and to facilitate its introduction into and removal from the centrifuging pot. This collar may be perforated, to permit escape of the liquids extracted from the cake by the centrifugal operation, but I have found that an unperforated collar may be used, in which case the liquid escapes around the top. The cake, after being inserted in the centrifuge pot, is centrifugally treated or "whizzed" at high speed, thereby both extracting liquid from the cake and restoring the cake to a substantially annular form, of smaller diameter than the original cake, but with desired "crinkles" or "waves", previously produced by the crimping, retained in the individual yarn strands, particularly in the outer portions of the cake. This desired "crinkled" characteristic of the yarn is, in fact, apparently increased by the "whizzing" operation, since the yarn cake, when inserted in the centrifuge pot, is greater in peripheral length than the inside of the pot, due to the corrugations previously imparted to the wall of the cake. When the cake is returned to substantially annular form by the action of the centrifugal force, the yarn strands on the outside of the cake, being longer than the inner periphery of the centrifuge pot, are necessarily "crinkled" or "waved", ordinarily in the form of rather sharp return or right-angle bends or folds, at spaced intervals in the yarn. Such bends or "crinkles" in the yarn are imparted to it by the centrifugal force, in compelling each successive convolution of yarn, of greater peripheral length than the inside of the pot, or the next outer layer of yarn, to reassume a substantially annular form. A similar, but progressively decreasing, effect appears to result in each successive inner layer of yarn in the cake, and the artificial crinkling of the yarn may decrease to almost nothing, or entirely disappear, in the innermost layers of yarn. But since the inner layers of the cake have a natural or inherent crinkle, decreasing outwardly, the result is a substantial compensation of the two effects, hence the resulting yarn cake, as a whole, possesses the desired substantial uniformity of crinkle of the yarn throughout the cake, when completed.

By suitably and properly varying, controlling, and correlating the steps of the process (crimping and centrifuging), the desired properties and characteristics may be produced in the resulting yarn.

In order to secure the benefits of my invention, and accomplish its results, it is not necessary that the crinkles in the yarn from the inside and outside of the cake should be exactly similar in appearance, or should have identical frequency and amplitude; it is generally sufficient if the yarn from the inside and outside of the cake has roughly or approximately the same percentage of its length taken up in the crinkles, thus giving an approximately uniform extensibility or "superficial elasticity", or degree of crinkle, to the yarn in all parts of the cake, as hereinafter more particularly described.

After the centrifuging operation the cake is preferably subjected to further drying, as in an oven or stream of hot air. This has the effect, apparently, of permanently setting the bends (which I ordinarily refer to herein as "crinkles") in the yarn. Due to the crinkled character of the resulting yarn, it has a highly desirable physical property of extensibility or elasticity, which I sometimes describe as a "superficial" elasticity because it permits the yarn to be stretched to a certain extent by merely straightening out the crinkles without changing the internal physical structure of the yarn itself. By the application of my process a substantially uniform elasticity is imparted to the yarn in all parts of the finished yarn cake, due to the fact that the normal crinkle of the yarn decreases from the inside of the cake outwardly, while, by means of my process, I impart a compensating or correcting artificial elasticity or crinkle to the yarn, progressively from the outside of the cake inwardly, to produce a substantially uniform elasticity of the yarn throughout the finished yarn cake.

The best form of apparatus, and resulting product, which I now know, in accord with my invention, and for use in practicing the process forming a part thereof, is illustrated in the accompanying drawings, in which:

Figure 1 is a general perspective view of the upper part of the crimping apparatus, at the beginning of the operating cycle;

Figure 2 is a partial perspective view of the same apparatus, with a yarn cake therein, at a maximum point of the crimping operation;

Figure 3 is a partial perspective of the same apparatus at the end of the operating cycle, showing the crimped yarn cake in ejected position and ready to be removed from the apparatus;

Figure 4 is a front elevation of the crimping apparatus, partly in cross-section;

Figure 7 is a perspective view of a rayon yarn cake before the crimping operation, and ready for the beginning of the operating cycle, the rayon cake being encased in a fabric covering, which is diagrammatically indicated as being partially broken away to show the yarn itself;

Figure 8 is a perspective view of a rayon yarn cake after the crimping operation, the cake being shown encased in its protective fabric covering;

Figure 9 is a perspective view of a rayon yarn cake after the whizzing operation which preferably follows the crimping, the fabric covering being diagrammatically indicated as partially broken away to show the surface of the yarn cake after completion of the centrifuging operation;

Figure 10 is a partial diagrammatic illustration indicating the relative size and shape of the outside of a rayon yarn cake at the completion of the various stages of the operating cycle;

Figure 10a is an enlarged diagrammatic view (somewhat exaggerated for the sake of illustration) of a portion of yarn from the outside of the yarn cake illustrated in Figure 10;

Figure 11 is a sectional view of the centrifugal apparatus, showing the centrifuge or "whizzing" pot, with the yarn cake contained therein, before the beginning of the centrifuging operation;

Figure 5:
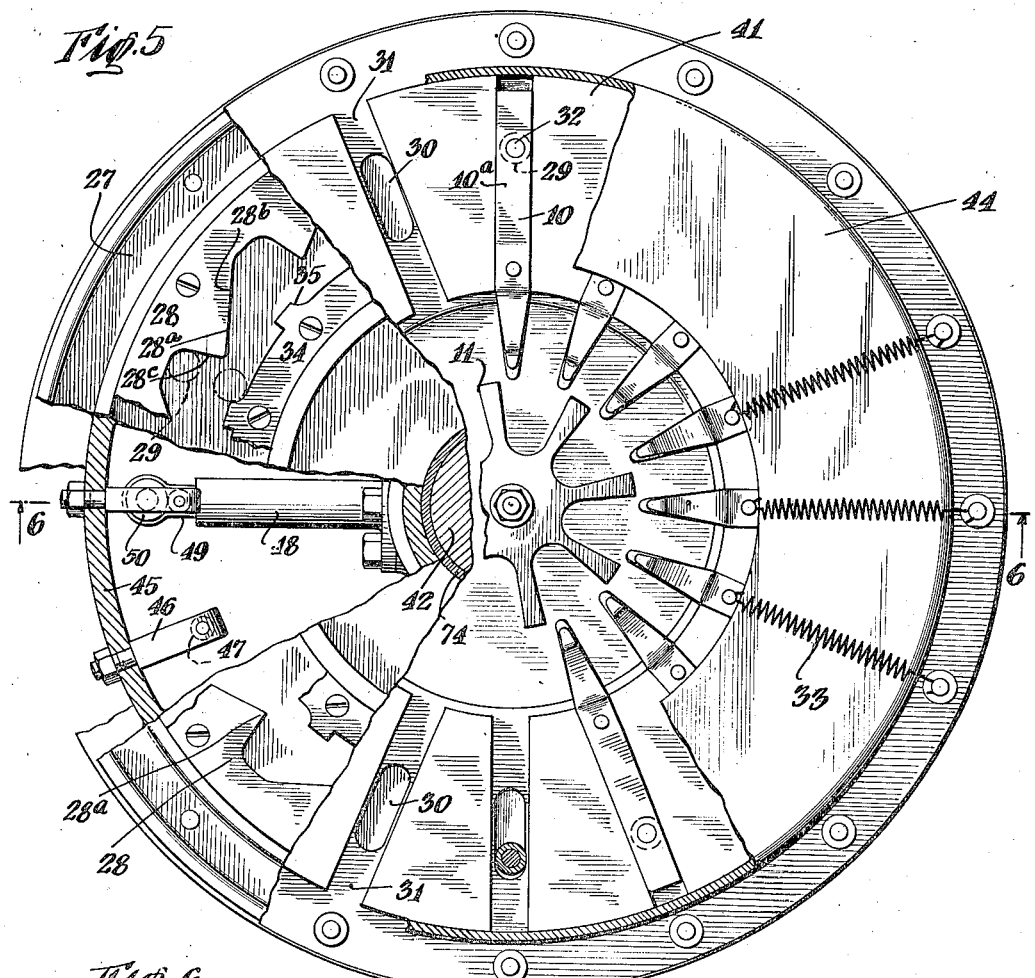
Figure 5 is a top plan view of the apparatus of Figure 4, partially broken away at various planes through the apparatus.

Figure 12 is a horizontal cross-section on the line 12—12 of Figure 11, showing, in a somewhat diagrammatic manner, and slightly exaggerated for the sake of illustration, the rayon yarn cake as inserted in the whizzing pot, before the beginning of the centrifuging operation; and Figure 13 is a similar view showing the yarn cake in the centrifuging pot, after the completion of the whizzing operation.

An important advantage of my invention is the resulting improvement in uniformity of dyeing quality of the finished yarn, and of the fabric produced therefrom. Other conditions being equal, yarn manufactured in accord with my invention takes a dye with greatly improved uniformity—that is, has a more uniform "dye index" or "dye affinity", by which I mean the amount of dye which the yarn will absorb under given conditions. This is found to be especially the case when the dyeing is performed after the yarn has been fabricated into cloth or knit goods. Not only is this latter condition (dyeing after fabrication) that which must be most frequently met by the yarn in commercial use; it is one of the most difficult conditions to meet in the manufacture of rayon yarn. It is possible that a given rayon yarn, from different parts of the same cake, may dye in the same way before fabrication, while, after fabrication, yarn from different parts of the same cake dyes to distinctly different shades, and in a non-uniform manner which makes the fabric non-saleable. This long-standing difficulty in the rayon industry is overcome by my invention.

It is to the accomplishment of the former result, viz, the production of a rayon yarn having a substantially uniform dye index, no matter from what portion of the yarn cake it is taken, that my copending applications Serial Nos. 586,553 and 745,712, filed respectively on the 14th of January, 1932 and the 27th of September, 1934, are primarily directed; the present invention goes even farther, in that it includes within its scope a rayon yarn, and a process and apparatus for the manufacture thereof, which yarn is adapted for fabrication into rayon materials which may be dyed with substantial uniformity after the fabrication thereof.

I am not certain of the theory or theories which account for the results just stated, but I believe that they have to do, at least in part, with the fact that a more uniform tension is maintained upon the yarn in different portions of the cake while it is being dried, and the further fact that what I have already referred to as a "superficial" elasticity is imparted to the yarn in a substantially uniform degree throughout the cake.

When a yarn cake of the usual hollow frustroconical form is dried in the ordinary manner of the prior art, I have found that the yarn undergoes a substantial shrinkage. The coils of yarn at and near the outer circumference of the yarn cake have less opportunity to contract than do those near the inside of the cake. The outer coils of yarn are supported against any very substantial contraction by the body of the cake, whereas the coils near the inside of the cake have no such support and can, therefore, contract relatively freely. The result is, that the yarn near the outside of the cake is subjected to greater tension, when dried, than is the yarn near the inside of the cake, which is able to contract more freely. Variation in the physical properties of the yarn from the inside to the outside of the cake has been found to result from this difference of tension.

Furthermore, I have found that when my invention is not employed the fact is that, after the yarn has been completed, yarn coming from near the inside of the cake appears to have a slight "crinkle" or waviness, apparently due to the fact that it was not subjected to undue tension, while yarn coming from the outer portion of the cake appears to be more nearly straight in structure. If the yarn or thread is knit, woven, or otherwise fabricated before it is dyed (as is usually the case) a substantially uniform tension is applied to the yarn during the knitting or weaving operation. The result is that the crinkled or wavy yarn from the inner portion of the cake merely has its crinkles and waves straightened out by the tension applied in the knitting or weaving operation, without substantially stretching the yarn itself, or changing its internal physical structure, while the relatively straight yarn from the outer part of the cake is, or tends to be, actually stretched, and the fibres themselves elongated, hence reduced in denier and rendered less receptive to dye because of the physical change produced by the stretching. Thus, when the yarn is fabricated, those parts of the cloth made with yarn from one part of the cake dye to a shade different from that of the parts of the fabric made with yarn from another part of the cake, producing an uneven or streaky appearance in the fabric. This effect can often be seen in the dyed fabric, sometimes resulting in a sharp line of division between different shades produced by the same dye.

I have found that the foregoing difficulties are overcome by my invention.

An important feature and advantage of my invention is that the yarn cake, before it is dried, is crimped and reduced in diameter, in such a way that when the cake is subsequently subjected to a centrifuging operation, and thereafter further dried, as described, a substantially uniform elasticity, due to "crinkle" or waviness, is imparted to yarn in all parts of the cake, and fabric made from the resulting yarn is found to be susceptible of being dyed with great uniformity.

I believe that the foregoing explanation of the reasons for some of the advantages of my invention is correct, but my invention is in no way dependent upon the correctness of the explanation. The fact is, as I have discovered, that when a yarn cake is treated as herein described and claimed, the quality of fabric produced from the yarn is markedly improved with respect to its uniformity of dyeing.

Moreover, the improvement in uniformity of dyeing quality is only one of the advantages arising from the use of my invention. Other advantages include the resulting improvement in uniformity of other qualities, especially physical properties, of the yarn, such as more uniform denier, strength, tenacity, and elongation, as well as the more uniform elasticity, "crinkle", or wave, in the thread from all parts of the cake, to which I have already referred. The latter quality, as well as the greater uniformity of strength, tends to decrease breakage during fabrication of the yarn by knitting, weaving or otherwise, in addition to its effect of imparting a more uniform dyeing quality to fabric produced from the yarn.

Referring now to the drawings in greater detail, Figure 1 is a general perspective view of the upper part of the crimping apparatus, at the beginning of its operating cycle. The apparatus includes a plurality of radially movable jaws, 10. In the position shown in Figure 1, these jaws are in their retracted, or open, position and the apparatus is at the beginning of its operating cycle, ready to be charged with a yarn cake to be crimped. The yarn cake carrying and ejecting plate, 11, is shown in its uppermost position, ready to receive the yarn cake. Such a yarn cake is shown at 12 (see Figures 2, 3, 7, 8 and 9), Figure 7 showing an example of the cake after it is purified or "processed" but before it is crimped.

Figure 6:
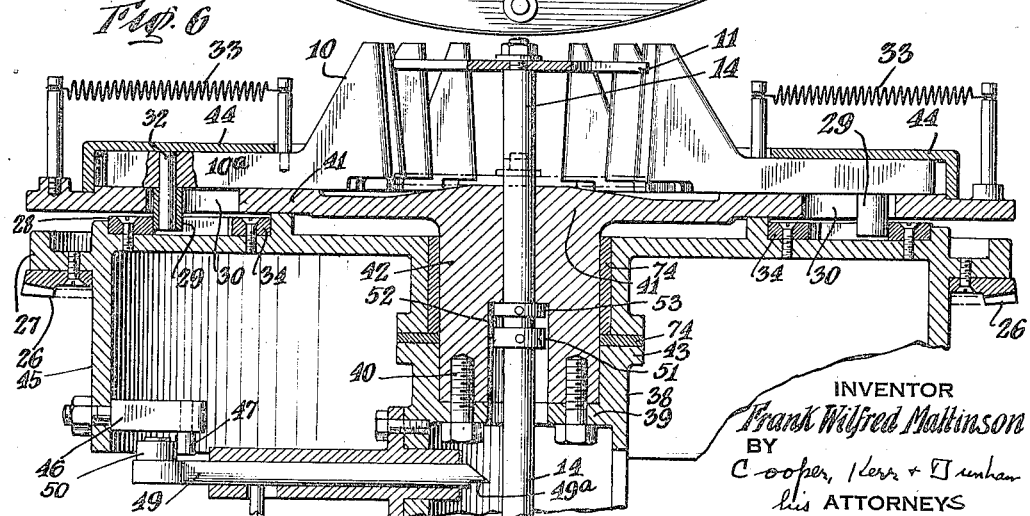
Figure 6 is a vertical cross-section on the line 6—6 of Figure 5.

The detailed construction and operation of the apparatus is shown by Figures 4, 5, and 6 in connection with Figures 1, 2 and 3.

The machine, first being in the position shown in Figures 1 and 6, the operator places a yarn cake 12, upon the cake carrier and ejector plate 11 (then in its uppermost position), and then depresses the foot treadle 13. Such depression of the treadle 13 draws the rod 14 in a downward direction by means of the linkage 15, acting against the spring 16. This downward movement of the rod 14 carries the cake-carrier plate, 11, with the yarn cake, 12, carried thereby, to its lowermost position, placing the cake within the jaws 10, and automatically locking it in such position by the locking means shown in detail in Figures 4 and 5, and to be hereafter more particularly described. The same depression of the treadle 13 may close the switch (not shown) of the electric motor, 24a, and also engages the clutch 17 (Figure 4) by downward motion of the bell crank lever 18, pivoted at 19 to the bracket 20. This motion of lever 18 is against the force of the spring 21. The clutch 17 is keyed at 22 to the horizontal shaft 23 of the electric motor and speed reduction gear unit 24, comprising the electric motor 24a and reduction gears 24b. The clutch 17 slides to the left on the shaft 23 (Figure 4), and thus forces the bevel gear 25 into engagement with the gear ring 26 which is mounted upon the lower face of the rotating table 27. The table 27 is thus rotated in a clockwise direction. The inner face of the rotating table 27 is provided with a cam ring 28 (see Figures 5 and 6) having a plurality of inwardly projecting cams 28a, one for each radially movable jaw 10. Rotation of the cam ring 28 for one-sixteenth of a revolution (there being sixteen jaws 10 in the form of machine illustrated in the drawings) thus serves to actuate the crimping machine through one cycle. The relatively gently sloping face 28b of each cam 28a forces the corresponding cam roller 29 radially inward (see Figure 6) in the slot, 30, of the jaw guideway or groove 31. Each cam-following roller 29 is affixed to a pin 32 (see Figure 6) which is in turn affixed to, and projects downwardly below, the radially-extending arm 10a of the appropriate jaw 10. The jaws 10 are thus forced radially inward to the position shown in Figure 2, and the yarn cake is reduced in diameter and crimped by this action of the jaws 10. The amplitude of motion of each jaw 10 is controlled by the length of the slot 30. As soon as the point of the cam 28a has passed the roller 29, the latter is retracted, by the spring 33, along the steep face 28c of the cam 28a. This retracting action of the spring 33 is supplemented by an additional cam ring, 34, provided with a plurality of reversely set cams 35 (see Figure 5), one for each jaw 10. These reversely set cams assist in returning the cam rollers 29 to their starting positions. The actuating apparatus is, of course, duplicated for each of the radially movable jaws 10; that is, there are, in the apparatus shown, sixteen cams 28a, sixteen cams 35, sixteen pins 32 and rollers 29, sixteen jaws 10, and so forth. For the sake of clarity, some of this duplication of apparatus is not shown in the drawings.

The movable portions of the apparatus are mounted upon a stationary frame or support 36 (see Figure 4), which carries the fixed platform 37, upon which is mounted the upstanding bearing member 38 (see Figures 4 and 6). This bearing member 38 is provided with an inwardly projecting flange 39 (Figure 4) to which is bolted, by means of the bolts 40, the fixed guide member 41, provided with a downwardly extending and centrally recessed fixed hub or neck 42. An outwardly projecting flange 43, at the upper part of the bearing member 38, supports the rotating table 27 upon which are mounted the cam rings 28 and 34. A suitable bushing is provided, as shown at 74. The radially movable jaws 10 are held in position in the guide grooves, 31, by means of a cover plate, 44, which bears upon the upper faces of the outwardly extending arms 10a of the jaws 10, thus locking the latter into their respective guide grooves 31, while permitting radial motion of the jaws under the compulsion of the cam rings 28 and 34.

An automatic locking and releasing mechanism is provided as follows:

The rotating table 27 is provided near its outer periphery with a depending flange member or skirt, 45, upon which are mounted, by means of the brackets 46, a plurality of downwardly projecting pins 47, the same in number as the movable jaws 10 (viz., sixteen in the case of the apparatus illustrated). Bolted upon the outer face of the bearing member 38 is a horizontal bearing member 48, forming both a bearing and a guide for the sliding latch pin 49. The latter is normally maintained in locking position by spring 72, but is provided at its outer end with a roller 50, adapted to be engaged by the pins 47, of which sixteen are provided in the apparatus shown. As the table 27 rotates for one-sixteenth of a revolution, as required for one operating cycle of the machine, the appropriate pin 47 engages the roller 50 and thus retracts the latch pin 49 (see Figure 6). When the appropriate pin 47 strikes and engages the roller 50, mounted on the outer end of latch pin 49, the latch 49a of the pin 49 is withdrawn from engagement with the latching ring 51, mounted upon the movable shaft 14. The shaft 14 then moves upwardly, under the compulsion of the spring 16, raising the yarn-cake-carrying and ejecting plate 11, mounted upon the upper end of rod 14. The upward movement of the latch ring 51 simultaneously releases the lever 18, which is forced upward by spring 21, and thus disengages the clutch 17, withdrawing the gear 25 from engagement with the ring gear 26, and stopping the apparatus. The switch of the electric motor 24a may, if desired, be opened automatically by this same motion of the rod 14. The member 42 is provided, in its bottom, with a central recess 52, which, in cooperation with the upper washer 53, mounted on the shaft 14, serves as a stop when the washer 53 engages the top of recess 52.

One cycle of operation of the crimping machine has thus been completed, by one-sixteenth of a revolution of the table 27. The crimped yarn cake has been ejected from the jaws 10 and is ready for removal from the apparatus, as shown in Figure 3. After removal of the cake, 12, the apparatus is ready for the commencement of a new cycle, as shown in Figure 1, and the operation is repeated in the same manner.

Each yarn cake may be, and preferably is, enclosed, throughout the liquid treating "processing" or purification operations, as well as during the subsequent crimping and centrifuging steps, in a suitable fabric covering, diagrammatically indicated at 55 (see Figures 2, 3, 7, 8, 9, 11, 12, and 13). This covering 55 preferably consists of an elastic fabric sleeve or "stocking" such as is described and claimed in United States Patent No. 2,002,481 to Beirne Gordon, Jr., and Harold J. V. Michel, patented May 21, 1935. This fabric covering or elastic sleeve affords valuable protection to the yarn during liquid treatment, crimping and drying, and I have found that its use is very advantageous in the process herein described.

The final step or steps of the "processing" operation ordinarily have to do with the drying of the cake, and are commonly performed first by a centrifugal extraction of liquid from the cake, by rapid rotation of the cake about its own vertical axis in a centrifuge pot or "whizzer", and then by air drying in a suitable oven or dryer. As a step of my process, subsequent to crimping, I prefer to subject the crimped cake to such a centrifugal operation, and have found that this centrifuging operation may be performed with advantage in a centrifuge pot of circular cross-section, but of substantially smaller diameter than the spinning pot in which the cake was originally spun, and, in fact, just sufficient in diameter to receive the cake after it has ben reduced in diameter by the crimping operation.

Suitable apparatus for the centrifugal liquid extraction or "whizzing" operation just described is shown in Figures 11, 12 and 13 of the drawings. Referring first to Figure 11, an electric motor 55, encased in a suitable protective hood 56, as illustrated, carries on the end of its vertical shaft, 57, a vertical spindle, 58, upon which there is fitted an adaptor, 59, fitting into a suitable bushing, 60, carried by the base, 61, of the centrifugal drying or centrifuge pot, 62, frequently referred to herein as a "whizzer." The construction of the adapter 59 and bushing 60 may suitably be such as is described and claimed in United States Patent No. 1,948,834 to Walter C. Volk, patented February 27, 1934. The "whizzing" pot 62 is provided with an apertured cover 63 held in place by an expanding bent wire spring member 64, which snaps into the groove 65 provided for the purpose, thus locking the cover 63 in place during the centrifugal "whizzing" of the cake. Due to the fact that a considerable amount of liquid is thrown off during the "whizzing", the whole apparatus is preferably encased in a wooden box or other suitable enclosure, 66, provided with a hinged lid, 67, and a drain channel, 68, through which liquid removed from the cake runs off and is discharged.

The centrifuge pot, 62, is circular in plan and in horizontal cross-section, and its interior diameter is preferably such that the yarn cake, when placed therein, makes close contact, at its projecting points 75, with the interior face, 70, of the vertical wall, 69, of the pot 62 (see Figure 12). The action of the centrifugal force is such that during the whizzing operation the yarn cake 12 (preferably encased throughout the process in the fabric 55) is forced back into a substantially annular form (see Figure 13), in which a large portion, or substantially the whole, of the exterior face of the cake lies against the inner face, 70, of the wall, 69, of the pot 62. Thus the previously crimped portions, 71, of the cake 12 are thrown outwardly by the centrifugal force. But since the periphery of the cake, 12, measured along its corrugations, is substantially greater than the internal periphery of the centrifuge pot, 62, the result of the centrifuging operation is to produce a substantially annular yarn cake, in which the individual threads or fibers have, throughout the cake, the desired and desirable "crinkle" or "wavy structure" heretofore referred to, and which I have found to be conducive to improved uniformity of dyeing quality in the yarn, particularly when fabric made from the yarn is dyed after fabrication.

The operation of the apparatus illustrated in the drawings has already been described in the foregoing description of the apparatus itself, but may be summarized as follows:

The apparatus being in its starting position, shown in Figure 1, the operator places a rayon yarn cake, such as that shown at 12 in Figure 7, and preferably encased in the fabric covering 55 shown in that figure, upon the cake carrying plate 11. After removing his hand from the cake, the operator depresses the foot treadle 13 (Figure 4). The rod 14 carrying the plate 11 and cake 12, moves downwardly, and the clutch 17 is simultaneously forced into engagement by the downward motion of the left hand end of lever 18, which is pressed downwardly by the lower face of the ring 51, mounted upon rod 14. The table 27 then makes one-sixteenth of a revolution, the cams 28a forcing the radially movable jaws 10 inwardly to crimp and compress the yarn cake 12, and reduce the diameter thereof. As soon as the high points of the cams 28a have passed over the rollers 29, (the apparatus then being in the position shown in Figure 2) the movable jaws 10 are retracted by the springs 33 and the reverse cams 35. The latch pin 49 is withdrawn by the pin 47 coming into engagement with roller 50, and the rod 14 springs upward under the compulsion of the spring 16, restoring the treadle 13 to its starting position. The crimped cake 12 is then in the ejected position shown in Figure 3 and may be removed by the operator, after which the machine is ready to begin a new cycle of operation, as shown in Figure 1.

Figure 1 thus illustrates the starting position; Figure 2 illustrates the midpoint of the cycle, in which the jaws 10 are in their closed position giving the maximum compression of the cake; and Figure 3 illustrates the end of the operating cycle.

After the crimping operation has been completed, the yarn cakes 12 are preferably subjected to centrifugal treatment and drying, as already described in connection with the apparatus shown in Figures 11, 12 and 13. After such treatment, already described in connection with that apparatus, the cakes may, if necessary, be finally dried in a hot air oven, or in other suitable manner, which serves not only to dry the yarn but to "set" the crinkles or waves therein, after which the elastic fabric covering 55 is turned back from the cake, and the yarn is wound into a cone or other package in which form it is to be sold or from which it is to be fabricated.

Such turning back of the fabric, and final winding of the yarn, is preferably performed in the manner described and claimed in United States Patent No. 2,002,481 to Beirne Gordon, Jr., and Harold J. Michel, patented May 21, 1935, heretofore referred to.

The yarn cake itself, at the various stages of the process, is shown in somewhat diagrammatic manner in Figures 7, 8, 9 and 10. In Figure 7 the cake is shown before crimping; in Figure 8 it is shown as it comes from the crimping machine after the crimping operation is completed (see Figure 3); and in Figure 9 the cake is shown as it comes out of the centrifuge pot (see Figure 13). The cake is put into the centrifuge pot (see Figure 12) in the form illustrated in Figure 8.

Figure 10 illustrates, in somewhat diagrammatic manner, the relative sizes and shapes of the outer surface of the cake at the different stages of the process. The outer circle of Figure 10 represents the outer circumference of the yarn cake, at the top, as shown in Figure 7, prior to the crimping operation. The dotted (inner) corrugated lines of Figure 10 illustrate the outside size and shape of the top of the cake after it has been crimped, as shown in Figure 8, thus simultaneously reducing the diameter of the cake and introducing corrugations therein. As also indicated in Figure 8, the amplitude of the introduced corrugations is greater at the outside than at the inside of the cake, thus producing the progressive compensation or artificial elasticity previously referred to, to correct the inherent decrease in elasticity from the inside of the cake outwardly. The full corrugated lines of Figure 10 illustrate the size and shape of the outside of the cake, at the top, after the centrifuging operation has been completed (see Figure 9). The cake has thus been restored, by the centrifugal operation, to a roughly or substantially annular shape, but the crinkles or waves have been imparted to the thread itself, as indicated by the full lines of Figure 10, the reduced diameter of the cake being maintained during the centrifuging operation. The waves or bends are preferably permanently set in the yarn by subsequent drying thereof, as, for example, in a hot air oven.

Figure 10a illustrates, in diagrammatic manner, and somewhat exaggerated for the purposes of illustration, a section of yarn unwound from the outer portion of a dryed and completed yarn cake made in accord with my invention, showing the "bends" or "crimps" after they have been more or less permanently set in the yarn by the drying thereof after completion of the centrifuging operation. The yarn in this condition is ready to be fabricated, or to be wound into a cone or other package in which form it is to be sold to a fabricator.

It is to be noted that it is not necessary, in order to practice my invention with success, that the crinkled yarn from the inside and outside of the cake should be identical in appearance, as regards the shape, depth, size and frequency of the crinkles; it is, in general, sufficient if the yarn from the inside, outside, and all intermediate portions, of the cake possesses substantially or approximately the same amount or degree of crinkle, or has substantially the same proportion of its length occupied thereby.

In the case of a yarn cake spun in a spinning bucket of the customary approximately six-inch diameter, the following approximate dimensions have been found to be satisfactory, by actual measurement:

Spinning pot:
- Diameter in inches _____ 6¼
- Height in inches _____ 3 5/16

Spun cake:
- Diameter in inches _____ 6⅛
- (Reduction in diameter due to shrinkage)
- Height in inches _____ 3 5/16

Washed and purified cake:
- Diameter in inches _____ 6⅛
- Height in inches _____ 3¼
- (Reduction in height due to compression in processing)

Crimped cake:
- Outside diameter of outer convolutions in inches _____ 5
- Height in inches _____ 3½
- (Increase in height due to elongation)
- Inside diameter of outer convolutions in inches _____ 4¼
- Height in inches _____ 3½
- (Increase in height due to elongation)

Whizzing bucket:
- Diameter in inches _____ 5¼
- Height in inches _____ 3 5/16

The dimensions refer to the diameter at the top of the spinning bucket and cake; there is an inward and downward taper of 5/32" on all the measurements given.

With the dimensions given, a suitable speed for the "whizzing" pot is about 6,000 R. P. M. for about two minutes.

I have observed that in drying a yarn cake of the approximate dimensions given, there occurs a substantial shrinkage in the yarn, frequently of the order of about six per cent of its length under the conditions herein stated. An important feature of my invention is that it may be so carried out as to permit such shrinkage to occur, in the drying of the yarn (subsequent to the centrifugal extraction of liquid therefrom), without subjecting the yarn to the tension and stretching which might take place if my invention were not employed. When my invention is not employed, and it is attempted to dry the yarn in cake form, it frequently happens that the yarn at or near the outside of the cake is subjected to considerable tension because of the shrinkage which occurs in drying, and such tension produces, or tends to produce, an undesirable alteration in the structure and physical properties of the yarn, resulting in non-uniformity of dyeing quality. So far as I know, all previous attempts to overcome this difficulty due to shrinkage have proven unsuccessful, and have resulted in "hard spots" or straight sections in the yarn, due to non-uniformity of shrinkage and tension during drying. My invention, however, overcomes this as well as the other difficulties previously mentioned.

For the reasons just stated, it is desirable that the reduction in diameter of the yarn cake, by the crimping operation performed in accord with my invention, should be at least sufficient to allow for the shrinkage of the yarn which occurs during the drying thereof. Such is, in fact, the case in the figures and dimensions given above; the yarn cake is sufficiently reduced in diameter by the crimping operation, and the centrifuge pot is sufficiently less in diameter than the spinning pot, so that the "crimps" or waves produced in the yarn comprise (in the preferred embodiment of my invention) at least as great a percentage of the length of the yarn as the yarn will contract during drying; that is, in the example given, the "crinkles" and "waves" occupy at least, and preferably more than, about six percent of the length of the yarn. Thus the "crimps" and "waves" comprise at least a sufficient amount of the yarn to allow for the shrinkage which occurs upon drying, and there is preferably a substantial excess in the crinkles, over and above what is taken up by shrinkage in drying, so that the finally purified and dried yarn, after shrinking to its fullest extent, is substantially uniformly crinkled and waved, has a substantially uniform extensibility and elasticity, and has a substantially uniform percentage of its length taken up by crinkles and waves, in all parts of the yarn cake. Thus yarn from all parts of the completed yarn cake has substantial uniformity of the properties stated. Such is the preferred method of practicing my invention, and is the result of the figures and dimensions herein given by way of example.

In order to facilitate introduction of the crimped cake 12 into the whizzing pot 62, and removal therefrom, I have found that it is often desirable to employ a celluloid collar around the crimped cake, as already mentioned. Such a collar is shown at 73 in Figures 11, 12 and 13, and may be perforated to permit escape of liquid extracted from the cake during the centrifugal process. However, I have found that an imperforate celluloid collar may be used, in which case the liquid escapes at the top of the collar and around the edges of the cover 63.

The celluloid collar 73 performs the dual function of acting like a "shoehorn" in facilitating insertion of the crimped cake, Figure 8, into the whizzing pot, as shown in Figure 12, and also facilitating the removal of the cake after it has been subjected to the centrifugal force. When such a celluloid collar 73 is employed the inner diameter of the centrifugal pot 62 should be sufficiently greater than the outer diameter of the crimped cake to allow for the insertion of the collar. This is indicated in the measurements given above.

In connection with the removal of the cake from the pot after it has been centrifuged, I have observed that, in the absence of a removable collar about the cake, such as 73, it is often difficult or impossible to remove the cake from the pot, indicating the substantial absence of internal strain in the yarn cake, after the centrifugal operation. Such absence of strain or tension in the cake, after the whizzing is completed (when the cake has previously been crimped in accord with my invention) is another advantage arising from the use of my invention, because I have observed that in the ordinary centrifugal treatment of a yarn cake, when my invention is not employed, the cake shrinks away from the walls of the centrifugal pot as soon as the latter is stopped, indicating that the fibres are under tension during the centrifugal operation.

The process, apparatus and product herein specifically illustrated and described are the best now known to me, but it is to be understood that the invention is not specifically limited thereto, but may be carried out in other ways without departing from its spirit, and within the scope of the following claims.

I claim:

1. A process of manufacturing rayon, comprising first spinning a rayon yarn cake by the centrifugal spinning system; then treating the spun cake to free the yarn from impurities, while maintaining the yarn in cake form; substantially reducing the diameter of the treated cake by subjecting it to radial compression at a plurality of points about its periphery; and centrifuging the reduced-diameter cake to extract liquid therefrom and to produce a substantially uniform degree of crinkle in the yarn throughout the cake.

2. A process of manufacturing rayon, comprising first spinning a rayon yarn cake by the centrifugal spinning system; then treating the spun cake to free the yarn from impurities, while maintaining the yarn in cake form; substantially reducing the diameter of the treated cake by subjecting it to radial compression at a plurality of points about its periphery; centrifuging the reduced-diameter cake to extract liquid therefrom and to produce a substantially uniform degree of crinkle in the yarn throughout the cake; and further drying the cake and setting the crinkle therein.

3. A process of manufacturing rayon which comprises spinning a rayon yarn cake by the centrifugal spinning method, treating the spun cake with suitable processing liquids, reducing the diameter of the cake and centrifuging the same while maintaining the reduced diameter thereof.

4. A process of manufacturing rayon which comprises spinning a rayon yarn cake by the centrifugal spinning method, reducing the diameter of the cake, and centrifuging the same while maintaining the reduced diameter thereof.

5. A process of manufacturing rayon comprising spinning a rayon yarn cake by the centrifugal spinning system, subjecting the yarn to desired liquid treatment while substantially maintaining the original form of the cake, crimping the cake by applying radial compression thereto at a plurality of relatively closely spaced points about its periphery, and centrifuging the crimped cake to restore it to a substantially uncrimped but still annular form in which the yarn strands in the outer portion of the cake are crinkled at a number of spaced points at least as great as said number of crimping points previously referred to, whereby the yarn in all parts of the cake is crinkled to substantially the same degree.

6. A process of manufacturing rayon yarn having a substantially uniform percentage of its length comprised by crinkle of the yarn, comprising first spinning a rayon yarn cake by the centrifugal spinning system, then subjecting the yarn to desired liquid treatment so as substantially to free it from impurities while substantially maintaining the original form of the cake, crimping the cake by applying radial compression thereto at a plurality of relatively closely spaced points about its periphery and thereby substantially reducing the diameter of the cake and simultaneously introducing crimps or corrugations into the wall thereof, restoring the cake to a substantially uncrimped but still annular form in which the yarn strands in the outer portion of the cake are artificially crinkled at a number of spaced points at least as great as said number of crimping points previously referred to, and drying the yarn, whereby yarn from all parts of the cake is crinkled to substantially the same degree and has a substantially uniform percentage of its length comprised by crinkle of the yarn.

7. In a process for the manufacture, by the centrifugal spinning system, of rayon yarn adapted for use in the warp threads of fabric to produce a rayon fabric having improved uniformity of dyeing properties, the step which comprises imparting to the yarn throughout the outer portion of a spun yarn cake an artificial crinkle comparable in degree to the crinkle which naturally occurs in the yarn in the inner portion of the cake, whereby the yarn in the resulting cake has a substantially uniform crinkle and elasticity in all parts of the cake, after the same is dried.

8. In a process for the manufacture of improved dyeing quality rayon by the centrifugal spinning system, the step which comprises simultaneously extracting liquid from a spun rayon yarn cake and imparting to the yarn throughout the outer portion of the cake an artificial crinkle comparable to the crinkle which naturally occurs in the yarn in the inner portion of the cake, whereby the yarn in the resulting cake has a substantially uniform superficial elasticity and crinkle in all parts of the cake, after the same is dried.

9. In the manufacture of rayon by the centrifugal spinning method, the process of imparting an artificial crinkle to yarn in the outer portions of a spun yarn cake, to simulate the crinkle which naturally occurs in the yarn in the inner portions of the cake after drying thereof, which comprises first reducing the diameter of the cake by radially crimping the same at a plurality of points about its periphery, and then subjecting the crimped cake to centrifugal action and thereby transforming the crimps of the cake into an artificial crinkle in the yarn in the outer portions thereof.

10. In the manufacture of rayon by the centrifugal spinning method, the process of imparting an artificial crinkle to yarn in the outer portions of a spun yarn cake, to simulate the crinkle which naturally occurs in the yarn in the inner portions of the cake after drying thereof, which comprises first reducing the diameter of the cake by radially crimping the same at a plurality of points about its periphery, and then converting the cake to uncrimped but still substantially annular form by transforming the crimps of the cake into an artificial crinkle in the yarn in the outer portions thereof.

11. In the manufacture of rayon by the centrifugal spinning method, the process of producing yarn having a substantially uniform elasticity, which comprises imparting a compensating artificial elasticity to the yarn in the outer portions of a spun yarn cake, to simulate and compensate for the natural elasticity occurring in the yarn from the inner portions of the cake upon drying thereof, said process being characterized by the fact that said compensating artificial elasticity is imparted to the yarn in the outer part of the cake by first reducing the diameter of the cake by radially crimping the same at a plurality of points about its periphery, subjecting the crimped cake to the action of centrifugal force, and then drying the yarn.

12. In the manufacture of rayon by the centrifugal spinning method, the process of compensating for the inherent natural progressive decrease in crinkle of the yarn from the inside of the cake outwardly, which comprises imparting a progressive compensating artificial crinkle to the yarn, said compensating crinkle decreasing progressively from the outside of the cake inwardly.

13. In the manufacture of rayon by the centrifugal spinning method, the process of compensating for the normal progressive decrease in elasticity of the yarn from the inside of the cake outwardly, which comprises imparting an opposite and substantially equal compensating superficial elasticity or crinkle to the yarn, said compensating crinkle decreasing progressively from the outside of the cake inwardly.

14. In the manufacture of rayon by the centrifugal spinning method, the process of producing yarn having substantially uniform crinkle which comprises compensating for the progressive decrease of elasticity of the yarn, normally occurring from the inside of the cake outwardly, by applying a corrective superficial elasticity or crinkle to the yarn progressively from the outside of the cake inwardly.

15. A process of manufacturing rayon yarn having a substantially uniform percentage of its length comprised by crinkle of the yarn, which comprises the steps of first spinning a rayon yarn cake by the centrifugal spinning method, substantially reducing the diameter of the cake and simultaneously introducing corrugations into the wall thereof, restoring the cake to substantially annular form in which the yarn in the outer portion of the cake is artificially crinkled, and drying the yarn with the artificial crinkles therein.

16. Process for the manufacture of rayon yarn having a substantially uniform percentage of its length comprised by crinkle of the yarn and adapted for fabrication, before being dyed, into rayon fabric susceptible of being dyed with high uniformity, which includes the steps of producing a spun rayon yarn cake by the centrifugal spinning method, introducing corrugations into the outer wall of the cake and simultaneously substantially reducing the diameter thereof, and thereafter restoring the cake to substantially uncorrugated but artificially crinkled approximately annular form, whereby the yarn in all parts of the cake, when completed, has a substantially uniform elasticity.

17. Process for the manufacture of rayon yarn having substantially uniform elasticity and adapted for fabrication, before being dyed, into rayon fabric susceptible of being dyed with high uniformity, which includes imparting a compensating artificial elasticity to the yarn in the outer portions of a spun yarn cake to compensate for deficiency of elasticity which would otherwise occur in the cake.

18. A washed and dried rayon yarn cake in which deficiency of elasticity of the yarn in certain portions of the cake is artificially compensated by a crinkling operation, in approximate proportion to the extent of the deficiency, whereby the resulting cake has substantial uniformity of elasticity throughout.

19. A rayon yarn cake in which the yarn in all parts of the cake has a substantially uniform degree of crinkle.

20. A washed and dried rayon yarn cake in which an artificial crinkle has been imparted to the yarn substantially uniform throughout the outer portions of the cake, simulating the natural crinkle occurring in the yarn in the inner portions of the cake upon drying thereof.

21. A purified and dried rayon yarn cake having a substantially uniform degree of artificial crinkle in the rayon throughout the entire outer part of the cake, said artificial crinkle being substantially equal in amount to the crinkle naturally occurring throughout the inner portions of the cake after the same has been dried.

22. A purified and dried rayon yarn cake having a substantially uniform degree of crinkle of the rayon in all parts thereof.

23. A rayon yarn cake in which naturally occurring gradual decrease in elasticity of the yarn from the inside to the outside of the cake is compensated by a crinkling operation to produce an artificial elasticity existing in the yarn progressively from the outside inwardly, whereby the yarn cake has substantially uniform elasticity of the rayon in all parts of the cake.

24. Apparatus for use in the manufacture of rayon, comprising a plurality of radially arranged movable jaws adapted to receive a spun rayon yarn cake; means for forcing said jaws radially inward, without altering the initial angle of the faces thereof, to engage a yarn cake placed therein, and to compress and crimp the same and reduce the diameter thereof; and means for retracting the jaws to release the compressed cake; said apparatus being characterized by the fact that throughout the inward travel of said jaws the face of each jaw remains substantially parallel to its position of initial engagement with the cake, and the inward motion of the jaws is accomplished without tilting about an horizontal axis.

25. Apparatus for use in the manufacture of rayon, comprising a plurality of radially arranged movable jaws adapted to receive a spun rayon yarn cake; means for forcing said jaws radially inward, to engage a yarn cake placed therein, and to compress and crimp the same and reduce the diameter thereof; means for retracting the jaws after the crimping operation is completed; and automatic means for ejecting the compressed cake from the jaws so that it is unnecessary for an operator to place his hand within them.

26. Apparatus for use in the manufacture of rayon, comprising a plurality of movable jaws arranged radially about an opening adapted to receive a spun rayon yarn cake to be compressed, a circular cam plate in operative association with said jaws and having a cam for each jaw, a cam follower associated with each jaw and arranged to force the jaw radially inward under the compulsion of said cams, means for rotating said cam plate to operate said jaws and to force the same radially inward, and means for retracting the jaws after the pressure of the cams is released.

27. Apparatus for use in the manufacture of rayon, comprising a plurality of movable jaws arranged radially about an opening adapted to receive a spun rayon yarn cake to be compressed, a circular cam plate in operative association with said jaws and having a cam for each jaw, a cam follower associated with each jaw and arranged to force the jaw radially inward under the compulsion of said cams, means for rotating said cam plate to operate said jaws and to force the same radially inward, positive means for retracting the jaws after they have reached their point of maximum inward motion, and an automatic ejector for raising a compressed yarn cake above the level of said jaws after they have been retracted.

28. The method of manufacturing rayon yarn adapted for fabrication, before being dyed, into rayon fabric susceptible of being dyed with high uniformity, which comprises the steps of first spinning a substantially annular rayon yarn cake by the centrifugal spinning pot method; then washing the spun yarn cake to free the yarn from impurities, while maintaining the yarn in cake form; then radially indenting the yarn cake at a plurality of spaced points about its periphery, without deforming the cake from its generally annular shape; centrifuging the radially indented cake to produce a substantially uniform degree of crinkle in the yarn throughout all parts of the cake; and subjecting the yarn to drying.

29. The process of manufacturing rayon which comprises first spinning a substantially annular rayon yarn cake by the centrifugal spinning system; then treating the spun cake to free the yarn from impurities, while maintaining the substantially annular form of the cake; reducing the diameter of the cake, without substantial distortion thereof, by an amount sufficient to permit subsequent drying of the yarn throughout the cake without subjecting the yarn anywhere within the cake to substantial tension due to shrinkage occurring during drying; and drying the yarn while still contained in the reduced-diameter cake.

30. The process of manufacturing rayon yarn adapted for fabrication, before being dyed, into rayon fabric having substantial uniformity of dyeing properties even when the dyed fabric includes yarn from a plurality of yarn cakes, which comprises the steps of first spinning a substantially annular rayon yarn cake, by the centrifugal spinning system; then treating the spun cake to free the yarn from impurities, while maintaining the substantially annular form of the cake; substantially reducing the diameter of the cake without material deformation or distortion thereof; centrifuging the reduced-diameter cake; and then drying the yarn still in cake form, and all while maintaining the original substantially annular form of the cake, without any material deformation thereof.

FRANK WILFRED MATTINSON.